United States Patent
Ito et al.

(10) Patent No.: US 7,802,035 B2
(45) Date of Patent: Sep. 21, 2010

(54) INFORMATION PROCESSING APPARATUS, IMAGING APPARATUS, INFORMATION PROCESSING METHOD AND COMPUTER PROGRAM

(75) Inventors: Ryogo Ito, Tokyo (JP); Hiroshi Shimono, Tokyo (JP); Junichi Yokota, Kanagawa (JP)

(73) Assignee: Sony Corporation (JP)

( * ) Notice: Subject to any disclaimer, the term of this patent is extended or adjusted under 35 U.S.C. 154(b) by 659 days.

(21) Appl. No.: 11/650,570

(22) Filed: Jan. 4, 2007

(65) Prior Publication Data
US 2007/0208890 A1 Sep. 6, 2007

(30) Foreign Application Priority Data
Jan. 5, 2006 (JP) .............................. P2006-000635

(51) Int. Cl.
*G06F 13/12* (2006.01)
(52) U.S. Cl. .............................. 710/74; 710/15; 710/17; 710/18; 710/38
(58) Field of Classification Search ........................ None
See application file for complete search history.

(56) References Cited

U.S. PATENT DOCUMENTS

| | | | |
|---|---|---|---|
| 7,103,712 B2 * | 9/2006 | Mizuno | 711/112 |
| 7,216,244 B2 * | 5/2007 | Amano | 713/324 |
| 7,437,053 B2 * | 10/2008 | Ishibashi | 386/46 |
| 7,518,633 B2 * | 4/2009 | Horie | 348/207.1 |
| 2004/0068672 A1 * | 4/2004 | Fisk et al. | 713/323 |
| 2004/0111558 A1 | 6/2004 | Kistler et al. | |
| 2005/0172074 A1 | 8/2005 | Sinclair | |

FOREIGN PATENT DOCUMENTS

| | | |
|---|---|---|
| JP | 2001-357599 A | 12/2001 |
| JP | 2004-289307 A | 10/2004 |
| JP | 2005-149643 A | 6/2005 |

OTHER PUBLICATIONS

"Reduce Low-End DASD Power by Adding Non-Volatile Memory Buffer" IBM Technical Disclosure Bulletin, IBM Corp. New York, US, vol. 39, No. 3, Mar. 1, 1996, p. 131, XP000581647 ISSN: 0018-8689.
Partial European Search Report, EP 06256482, mailed Jul. 23, 2009.

* cited by examiner

*Primary Examiner*—Eron J Sorrell
(74) *Attorney, Agent, or Firm*—Lerner, David, Littenberg, Krumholz & Mentlik, LLP

(57) ABSTRACT

An information processing apparatus may include plural media capable of recording data, and a control unit executing operation control of the plural media and at least one medium in the plural media may be a mechanical operation executing medium performing mechanical operations, and the control unit may decide whether the mechanical operation executing medium is selected as an access target, and when the medium is not selected as the access target, perform processing of setting the mechanical operation executing medium to a waiting state.

13 Claims, 13 Drawing Sheets

FIG. 2

| MODE | | IDE I/F | SPINDLE | HEAD | SERVO | RF |
|---|---|---|---|---|---|---|
| MODE 1 | (WRITE) | ENABLE | ROTATING | LOAD | ON | ENABLE |
| | (READ) | | | | | |
| MODE 2 | PERFORMANCE IDLE | ENABLE | ROTATING | LOAD | ON | DISABLE |
| MODE 3 | ACTIVE IDLE | ENABLE | ROTATING | LOAD | OFF | DISABLE |
| MODE 4 | LOW POWER IDLE | ENABLE | ROTATING | PARKING | OFF | DISABLE |
| MODE 5 | STANDBY | ENABLE | STOP | PARKING | OFF | DISABLE |
| MODE 6 | SLEEP | LOWEST | STOP | PARKING | OFF | DISABLE |
| MODE 7 | POWER OFF | DISABLE | STOP | PARKING | OFF | DISABLE |

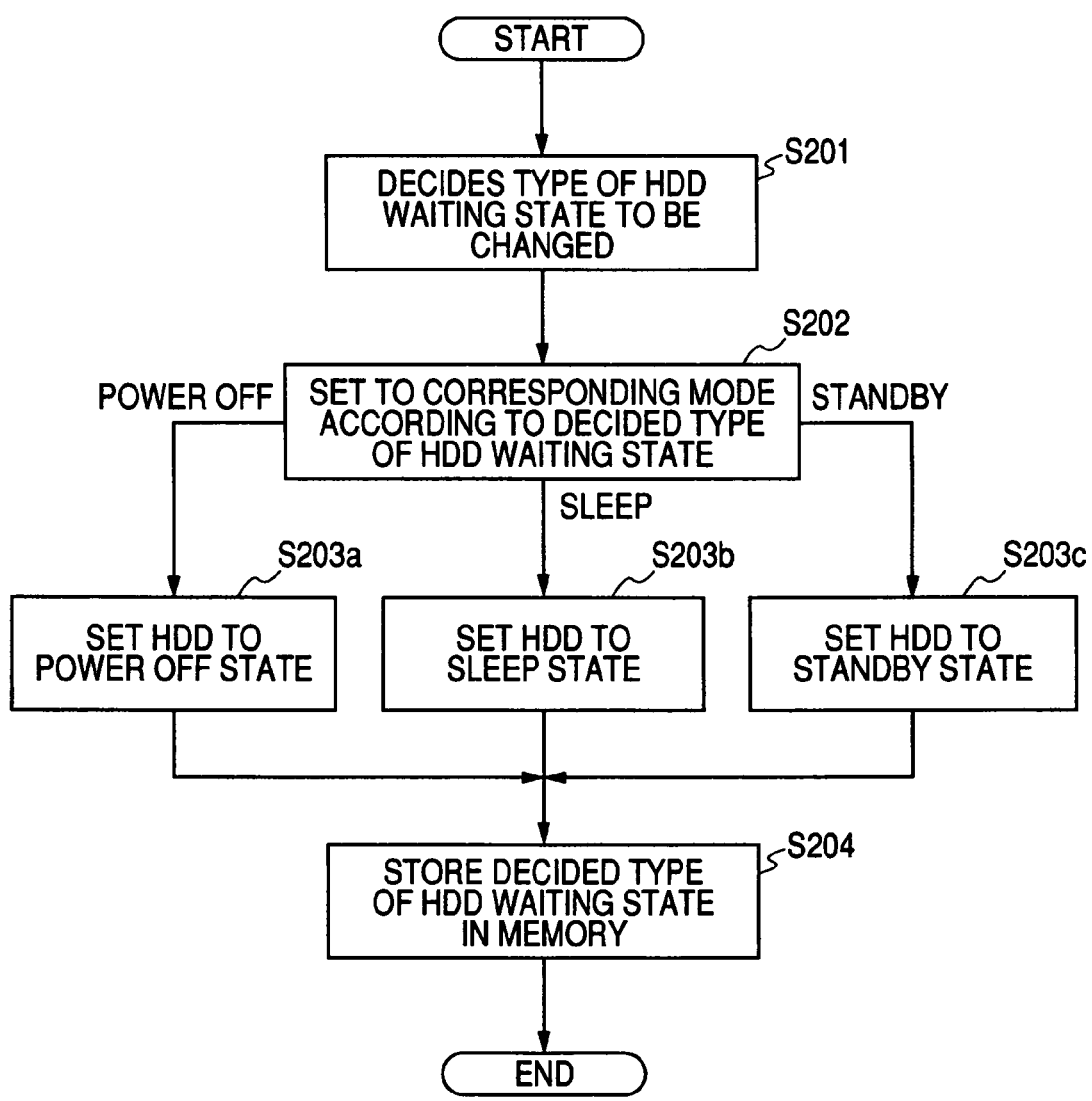

FIG. 5A

| STATE IDENTIFIER | STATE TYPE |
|---|---|
| 1 | POWER OFF |
| 2 | SLEEP |
| 3 | STANDBY |
| 0 | NON-WAITING STATE |

FIG. 5B

| MEDIA NUMBER | MEDIA TYPE | WAITING STATE IDENTIFIER | WAITING PROCESSING INFORMATION | RETURN PROCESSING INFORMATION |
|---|---|---|---|---|
| 1 | HARD DISK DRIVE (HDD) | 3 | HDD WAITING STATE SETTING PROCESSING INFORMATION | HDD RETURN PROCESSING SETTING INFORMATION |

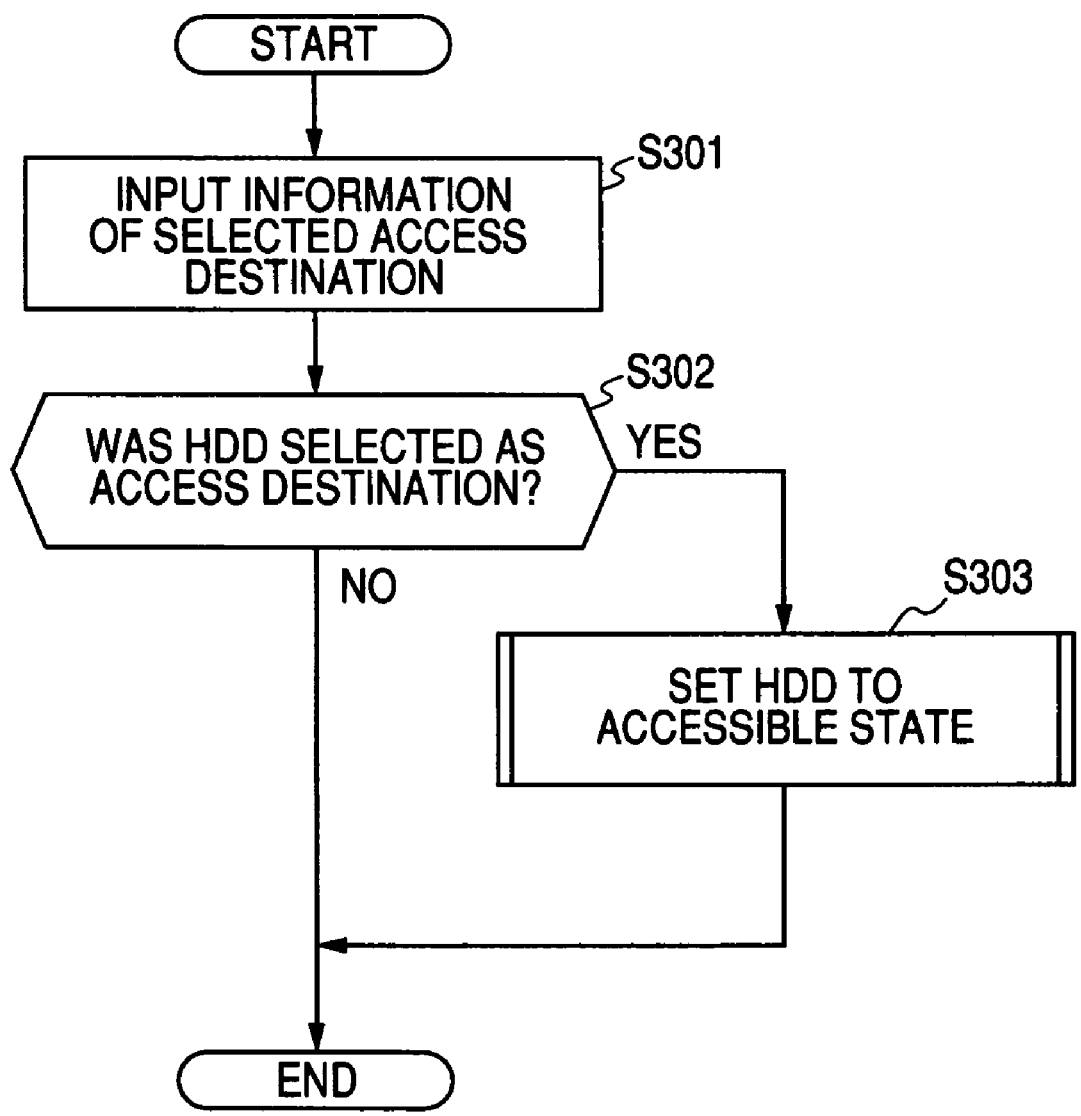

FIG. 9

| MEDIA NUMBER | MEDIA TYPE | STATE IDENTIFIER | WAITING PROCESSING INFORMATION | RETURN PROCESSING INFORMATION |
|---|---|---|---|---|
| 1 | HARD DISK DRIVE (HDD) | 3 | HDD WAITING STATE SETTING PROCESSING INFORMATION | HDD RETURN PROCESSING SETTING INFORMATION |
| 2 | FLASH MEMORY a | 1 | FMa WAITING STATE SETTING PROCESSING INFORMATION | FMa RETURN PROCESSING SETTING INFORMATION |
| 3 | FLASH MEMORY b | 0 | FMb WAITING STATE SETTING PROCESSING INFORMATION | FMb RETURN PROCESSING SETTING INFORMATION |

INFORMATION PROCESSING APPARATUS, IMAGING APPARATUS, INFORMATION PROCESSING METHOD AND COMPUTER PROGRAM

CROSS REFERENCES TO RELATED APPLICATIONS

This application claims priority from Japanese Patent Application JP 2006-000635 filed in the Japanese Patent Office on Jan. 5, 2006, the entire content of which is incorporated herein by reference.

BACKGROUND OF THE INVENTION

1. Field of the Invention

The present invention relates to an information processing apparatus, an imaging apparatus, an information processing method and a computer program. More particularly, the invention relates to the information processing apparatus, the imaging apparatus, the information processing method and the computer program which include plural recording media and have a configuration capable of recording data in a selected medium, in which at least one recording medium is the medium which requires mechanical operations such as head seek, disk rotation like a hard disk.

2. Description of the Related Art

In information processing equipment such as a digital video camera or the like, various kinds of media can be applied as data recording media, such as a hard disk, a DVD, a flash memory and the like. In addition, there is an information processing apparatus such as an imaging apparatus capable of selectively recording data in plural different media, for example, the hard disk and the flash memory.

In the above apparatuses capable of selecting recording media, when an operation occurs in one medium while data is recorded using the other medium, there arises a problem that operation noise is taken as noise which deteriorates quality of recoded data. Especially, a HDD (hard disk drive) has many factors causing mechanical motions such as load and unload processing of the head, start and stop of disk rotation, which generates a great deal of operation noise.

For example, when operation control in the HDD is performed while data recording, especially recording of audio data is performed in a flash memory, noise is generated by the control, and the generated noise deteriorates quality of record data.

As a technique of preventing adverse effect to record data by mechanical noise caused by the HDD, there is a configuration written in JP-A-2005-149643 (Patent document 1). In Patent document 1, there is disclosed a configuration of control which prevents mechanical noise into record data by controlling processing timing such as generating processing of record data in the hard disk and load processing of the head in the hard disk. However, the configuration of Patent document 1 shows the control of data recording in an apparatus including only the hard disk as the recording medium, and does not show a control configuration in an apparatus having plural recording media, which are, in addition to the hard disk, the flash memory and the like other than the hard disk.

In the information processing apparatus such as the imaging apparatus, which is capable of selectively recording data in plural different media such as the flash memory in addition to the hard disk, for example, when head moving processing, start and stop processing of disk rotation and the like are performed in the hard disk during recording of data in the flash memory, there arises a problem that mechanical noise generated by the HDD is mixed into record data in the flash memory, which deteriorates quality of record data.

SUMMARY OF THE INVENTION

In view of the above, in the information processing apparatus such as an imaging apparatus, including plural recording media and have a configuration in which data is recorded in a selected medium, in which at least one recording medium is the medium which performs mechanical operations such as head seek, disk rotation like a hard disk, it is desirable to provide an information processing apparatus, an imaging apparatus, an information processing method and a computer program preventing deterioration of quality of record data due to noise caused by the mechanical operations.

According to an embodiment of the invention, there is provided an information processing apparatus including: plural media capable of recording data, and a control unit executing operation control of the plural media, and at least one medium in the plural media is a mechanical operation executing medium performing mechanical operations and the control unit decides whether the mechanical operation executing medium is selected as an access target, and when the medium is not selected as the access target, performs processing of setting the mechanical operation executing medium to a waiting state.

According to an embodiment of the information processing apparatus of the invention, the control unit executes processing of recording waiting state type information into a storage unit at the time of setting processing of the mechanical executing medium to the waiting state.

According to an embodiment of the information processing apparatus of the invention, the waiting state type information includes at least any state information of a power off state, a sleep mode state and a standby mode state.

According to an embodiment of the information processing apparatus of the invention, the control unit executes processing of recording information applied to processing of changing from the waiting state to an accessible state into the storage unit at the time of setting processing of the mechanical executing medium to the waiting state.

According to an embodiment of the information processing apparatus of the invention, the control unit decides whether the mechanical operation executing medium is selected as the access target or not, and when the medium is selected as the access target as well as in the waiting state of the mechanical operation executing medium, performs processing of changing the mechanical operation executing medium from the waiting state to the accessible state.

According to an embodiment of the information processing apparatus of the invention, the control unit acquires waiting state type information from the storage unit and performs a return processing sequence corresponding to the waiting state decided based on the type information at the time of processing of changing the mechanical executing medium from the waiting state to the accessible state.

According to an embodiment of the information processing apparatus of the invention, the mechanical operation executing medium is a hard disk.

Furthermore, according to an embodiment of the invention, there is provided an imaging apparatus including: an imaging unit, plural media capable of recording data acquired in the imaging unit, and a control unit executing operation control of the plural media and at least one medium of the plural media is a mechanical operation executing medium performing mechanical operations, and the control unit decides whether the mechanical operation executing medium is selected as an access target, and when the medium is not selected as the access target, performs processing of setting the mechanical operation executing medium to a waiting state.

Furthermore, according to an embodiment of the invention, an information processing method includes the steps of: inputting access information of a medium selected as an access destination in plural media which are capable of recording data, deciding whether a mechanical operation executing medium is selected as an access target or not, and setting the mechanical operation executing medium to a waiting state when the mechanical operation executing medium is not selected as the access target.

According to an embodiment of the information processing method of the invention, the information processing method further includes the step of executing processing of recording waiting state type information into a storage unit at the time of setting processing of the mechanical executing medium to the waiting state.

According to an embodiment of the information processing method of the invention, the waiting state type information includes at least any state information of a power off state, a sleep mode state and a standby mode state.

According to an embodiment of the information processing method of the invention, the information processing method further includes the step of executing processing of recording information applied to processing of changing from the waiting state to an accessible state into the storage unit at the time of setting processing of the mechanical executing medium to the waiting state.

According to an embodiment of the information processing method of the invention, the information processing method includes the steps of deciding whether the mechanical operation medium is selected as the access target or not, and changing the mechanical operation executing medium from the waiting state to the accessible state when the medium is selected as the access target as well as in the waiting state of the mechanical operation executing medium.

According to an embodiment of the information processing method of the invention, the information processing method includes the steps of acquiring waiting state type information from the storage unit, and performing a return processing sequence corresponding to the waiting state decided based on the type information at the time of processing of changing the mechanical executing medium from the waiting state to the accessible state.

According to an embodiment of the information processing method of the invention, the mechanical operation executing medium is a hard disk.

Furthermore, according to an embodiment of the invention, a computer program allowing the information processing apparatus to execute control of recording media, executing the steps of: inputting access information of a medium selected as an access destination in plural media which are capable of recording data, deciding whether a mechanical operation executing medium is selected as an access target or not, and setting the mechanical operation executing medium to a waiting state when the mechanical operation executing medium is not selected as the access target.

The computer program according to an embodiment of the invention is a program which can be provided by recording media such as CD, FD, and MO, or communication media such as networks, which are provided in a computer readable form with respect to a general-purpose computer system capable of executing various program codes. Such programs are provided in the computer readable form, thereby realizing processing corresponding to the program on the computer system.

Further other objects, features or advantages of the invention will be clarified by more detailed explanation based on a later-described embodiment of the invention and attached drawings. In addition, a system means, in the specification, a logical assembly configuration of plural devices, and it is not limited to the system in which devices of respective configurations are in the same casing.

BRIEF DESCRIPTION OF THE DRAWINGS

FIG. 2 is a table explaining modes capable of being set in a hard disk drive (HDD);

FIG. 4 is a diagram showing a flowchart explaining the sequence of changing a recoding medium to the waiting state executed in the imaging apparatus as an embodiment of the information processing apparatus of the invention;

FIG. 5 are a setting example of state identifiers of the recording medium, and an example of information stored in a memory;

FIG. 6 is a diagram showing a flowchart explaining a sequence of changing the recording medium from the waiting state to an accessible state executed in the imaging apparatus as an embodiment of the information processing apparatus of the invention;

FIG. 9 is a table explaining a data configuration example of a media list in which information of state identifiers of recording media and the like are stored;

DESCRIPTION OF THE PREFERRED EMBODIMENTS

Hereinafter, the details of an information processing apparatus, an imaging apparatus, an information processing method and a computer program according to an embodiment of the invention will be explained with reference to the drawings. The invention can be applied to various kinds of apparatuses in which plural recording media can be selectively applied and at least one recording medium thereof is the recording medium which requires mechanical operations such as seek operation of the recording or reading head, load processing, and disk rotation, namely, a mechanical operation executing medium.

Hereinafter, as an information processing apparatus according to an embodiment of the invention, a configuration and processing of an imaging apparatus will be explained, in which a hard disk which is a mechanical operation executing medium and a flash memory as data recording media are included and these media can be selectively applied as recording media.

Figure 1:
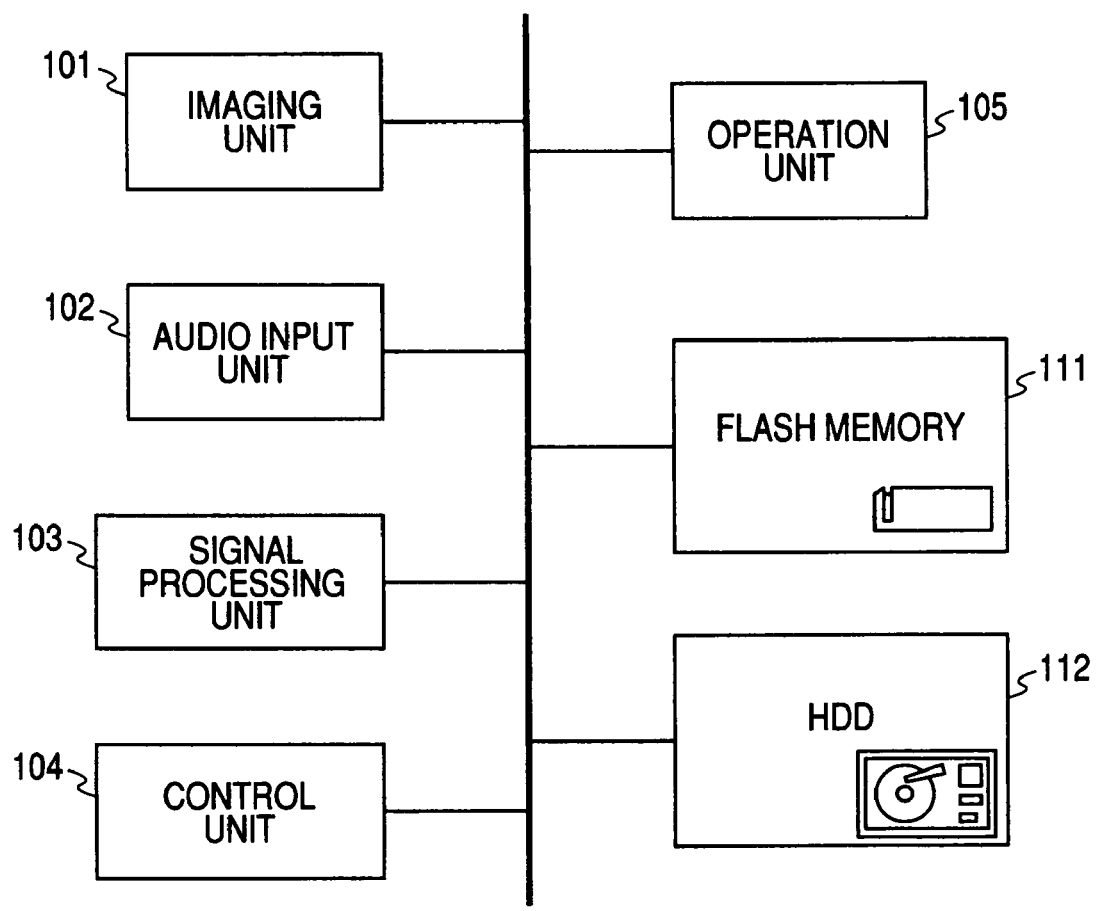
FIG. 1 is a diagram showing a main part configuration of an imaging apparatus as an embodiment of an information processing apparatus of the invention.

In FIG. 1, a block diagram explaining a main configuration of an imaging apparatus according to an embodiment of the invention is shown. FIG. 1 is the block diagram showing the main configuration required for explaining the embodiment of the invention, and the detailed configuration of the apparatus will be explained later. The imaging apparatus includes, as shown in FIG. 1, an imaging unit 101, an audio input unit 102, a signal processing unit 103, a control unit 104, and an operation unit 105, as well as includes a flash memory 111 and a hard disk 112 as recording media.

The imaging unit 101 has an optical system, an imaging element and the like, taking picture data. The audio input unit 102 has a microphone, acquiring audio information. The signal processing unit 103 converts picture signals acquired in the imaging unit 101 and audio signals acquired in the audio input unit 102 into a data state to be recorded in the recording media, for example, executing compression processing, format generating processing and the like. The control unit 104 performs control of processing executed in the apparatus such as control of data recording and operation control of recording media.

The operation unit 105 has buttons, switches and the like operated by a user, inputting start and stop of taking pictures, and further, selection information of recording media. The flash memory 111 and the hard disk (HDD) 112 are recording media, in which picture signals acquired in the imaging unit 101 and audio signals acquired in the audio input unit 102 are recorded.

The hard disk (HDD) 112 used as one of recording media is the recording medium requires mechanical operations such as seek operation of recording or reading the head, load processing, disk rotation and the like, namely, the mechanical operation executing medium. The hard disk (HDD) 112 has plural modes corresponding to different operation states, in which each mode is switched according to control by the control unit 104. An example of mode types in the hard disk (HDD) 112 will be explained with reference to FIG. 2.

In the example shown in FIG. 2, seven modes are shown as modes which can be set by the hard disk (HDD). There are seven stages of modes from a mode 1 corresponding to a mode during execution of actual data recording and reading to a mode 7 corresponding to a power-off state. In respective modes, state settings are different in an IDE interface, a spindle, a head, a servo and a RF circuit.

For example, in the case of "active idle" in the mode 3, the RF circuit is disable, the servo is in off state, and others are in operation. Power consumption decreases as the mode proceeds from the mode 1 to the mode 7.

Switching between respective modes is performed by control by the control unit 104. When the mode is switched, there sometimes occur various mechanical operations. For example, when "active idle" in the mode 3 is switched to "low power idle" in the mode 4, unload processing of the head is executed. When "low power idle" in the mode 4 is switched to "standby" in the mode 5, stop operation of the spindle occurs.

When "standby" in the mode 5 is switched to "low power idle" in the mode 4, rotation start operation of the spindle occurs, and when "low power idle" in the mode 4 is switched to "active idle" in the mode 3, load operation of the head is performed.

The above mechanical operations inevitably cause mechanical operation noise. During the mechanical operation, when data is recorded in another recording medium, for example, the flash memory 111 in the configuration shown in FIG. 1, the mechanical noise is mixed into recording signals, which leads to deterioration of quality of recording signals.

The modes and mode names shown in FIG. 2 are examples, and there are many other mode and mode names. However, the configuration in which various operations are performed and noise occurs when switching between respective modes is common to one another. In the information processing apparatus according to the embodiment of the invention, the control is executed by the control unit 104 so that mechanical noise caused when switching modes does not affect record data. The details of control processing in the information processing apparatus according to the embodiment of the invention will be explained with reference to FIG. 3.

Figure 3:
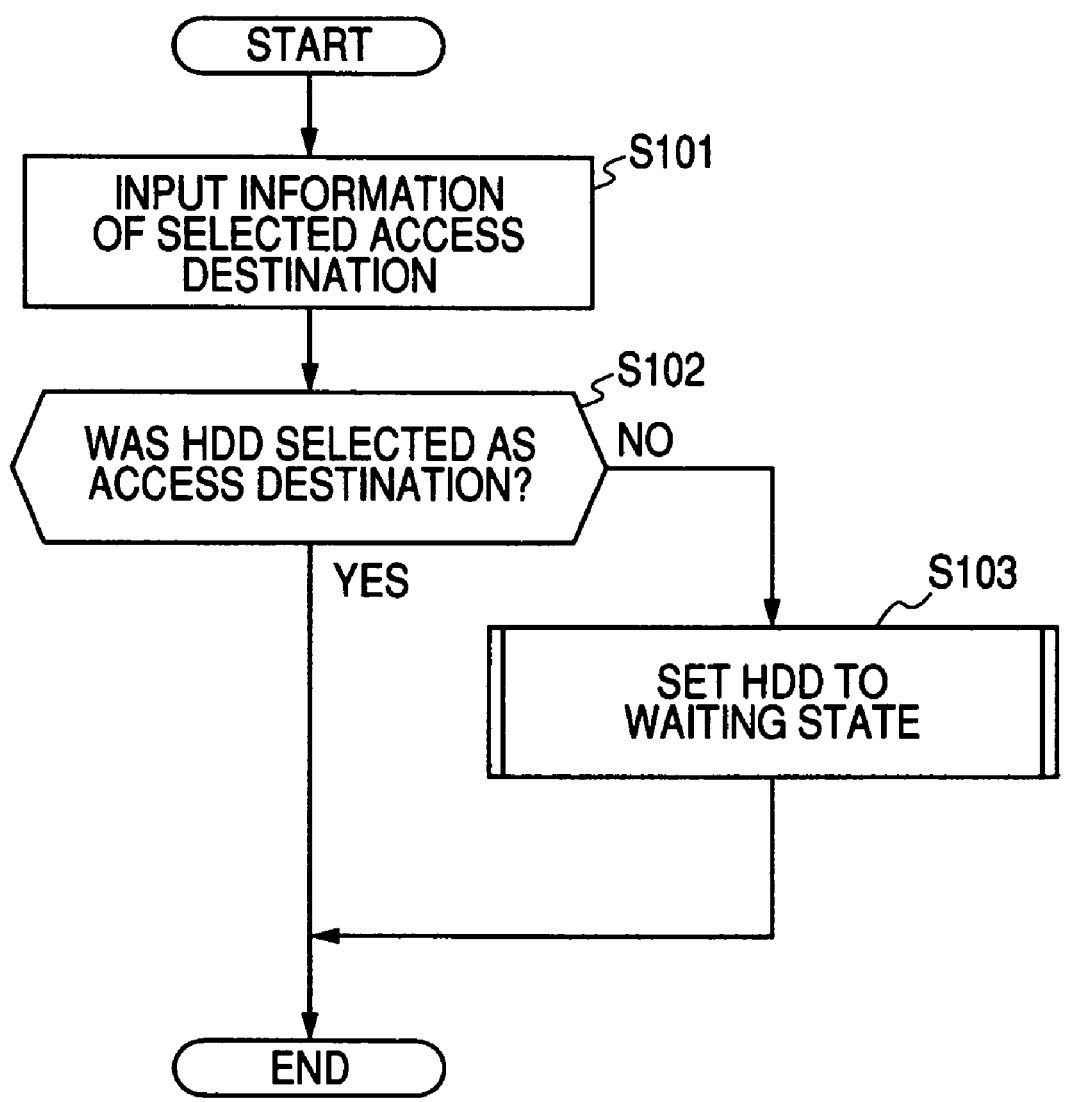
FIG. 3 is a diagram showing a flowchart explaining a sequence of changing a recoding medium to a waiting state executed in the imaging apparatus as an embodiment of the information processing apparatus of the invention.

FIG. 3 is a diagram showing a flowchart explaining a sequence of setting processing to a waiting state performed by recording media, the hard disk (HDD) in the embodiment, which requires mechanical operations such as seek operation of the recording or reading head, load operation, disk rotation and the like. In the information processing apparatus according to the embodiment of the invention, when the HDD is not selected as an access destination (it can be a recording destination or a reading source), the HDD is set to the waiting state, after that, processing of returning the HDD to the accessible state is performed when the HDD is set as the access destination again.

The waiting state of HDD means the state in which at least rotation of the spindle is stopped and the head is parked, that is, any state of the mode 5 to mode 7 in the configuration of mode setting shown in FIG. 2. The accessible state means the state in which data recording and reading are available, that is, any state of the mode 1 to mode 4 in the mode setting shown in FIG. 2.

Referring to the flow of FIG. 3, the sequence of setting processing to the waiting state of the hard disk (HDD) will be explained. The processing is executed by control by the control unit 104 in the apparatus shown in FIG. 1. First, in step S101, access destination (recording destination or reading source) information is inputted. The information is information determined by program control which automatically executes processing of deciding a recording medium, for example, with user input from the operation unit 105, mount and unmount processing of various media such as mount and unmount of a removable flash memory, or activation processing.

The control unit decides whether the HDD was selected as an access destination in step S102, and when it is judged that the HDD was not selected as the access destination, the process proceeds to step S103, where processing of setting the HDD to the waiting state is performed.

The detailed sequence of setting processing to the waiting state of the HDD in step S103 will be explained with reference to a flowchart shown in FIG. 4. The control unit decides a type of the waiting state to be changed in step S201. As described above, there are plural types of waiting states. In this case, there are three types of waiting states, namely, power-off, sleep, and standby states.

The control unit decides the waiting state of the HDD to be changed based on default setting information fixedly set in advance, or based on the user setting information. That is, the mode to be changed when the HDD was not selected as the access destination is decided according to any setting information of setting to be continuously power-off state, or setting to be changed to the sleep state or the standby state.

When the state to be changed is decided, in step S202, state-changing processing according to the decided waiting state type of the HDD is started. In the case of changing to the power off state, in step S203a, the HDD is set to the power off state, in the case of changing to the sleep state, in step S203b, the HDD is set to the sleep state, and in the case of changing to the standby state, in step S203c, the HDD is set to the standby state.

In order to switch the HDD to the standby state, processing of outputting a "STANDBY IMMEDIATE" command to the HDD is executed, which is prescribed by "ATA/ATAPI-6 (AT Attachment with Packet Interface-6) and the like, and in order to switch the HDD to the sleep state, a "SLEEP" command is outputted to the HDD, that is, processing according to the prescribed mode change is performed by a program according to respective change modes.

When the state-changing processing is finished, the process proceeds to step S204, where the setting state type information indicating the type of set waiting state is recorded in the memory and the process ends. For example, as shown in FIG. 5A, state identifiers according to states of recording media are previously set.

There are the following state information.
1: power off state
2: sleep state
3: standby state
0: non-waiting state In step S204, any of identifiers 1 to 3 indicating the state set as the HDD waiting state is recorded in the memory. The setting state type information is read in the control unit at the time of return processing from the waiting state to the accessible state, and the control unit selects a return processing program necessary for the return from each waiting state based on the setting state type information read from the memory to perform positive return.

It is also preferable that, for example as shown in FIG. 5B, program information executed at the time of waiting processing, parameter information stored at the time of the waiting and the like are set in the memory as waiting processing information, in addition to setting state identifiers, and further, program information which becomes necessary for return processing, parameter information which becomes necessary for the return and the like are recorded in the memory as return processing information.

In the flow shown in FIG. 4, the configuration in which one waiting state to be changed when HDD was not selected as the access destination is decided based on the default setting information or the user setting information, however, it is also preferable to take a configuration in which the waiting state is changed as time passes by. For example, an initial changing state in the case that the HDD was not selected as the access destination is allowed to be the standby state, and when time previously set in the standby state passed by, the state is changed to the sleep state, and further, when time previously set in the sleep state passed by, the state is changed to the power off state, and so on. In the case of taking this setting, processing of sequentially updating waiting state type information stored in the memory is performed at the time of each state change.

Figure 7:
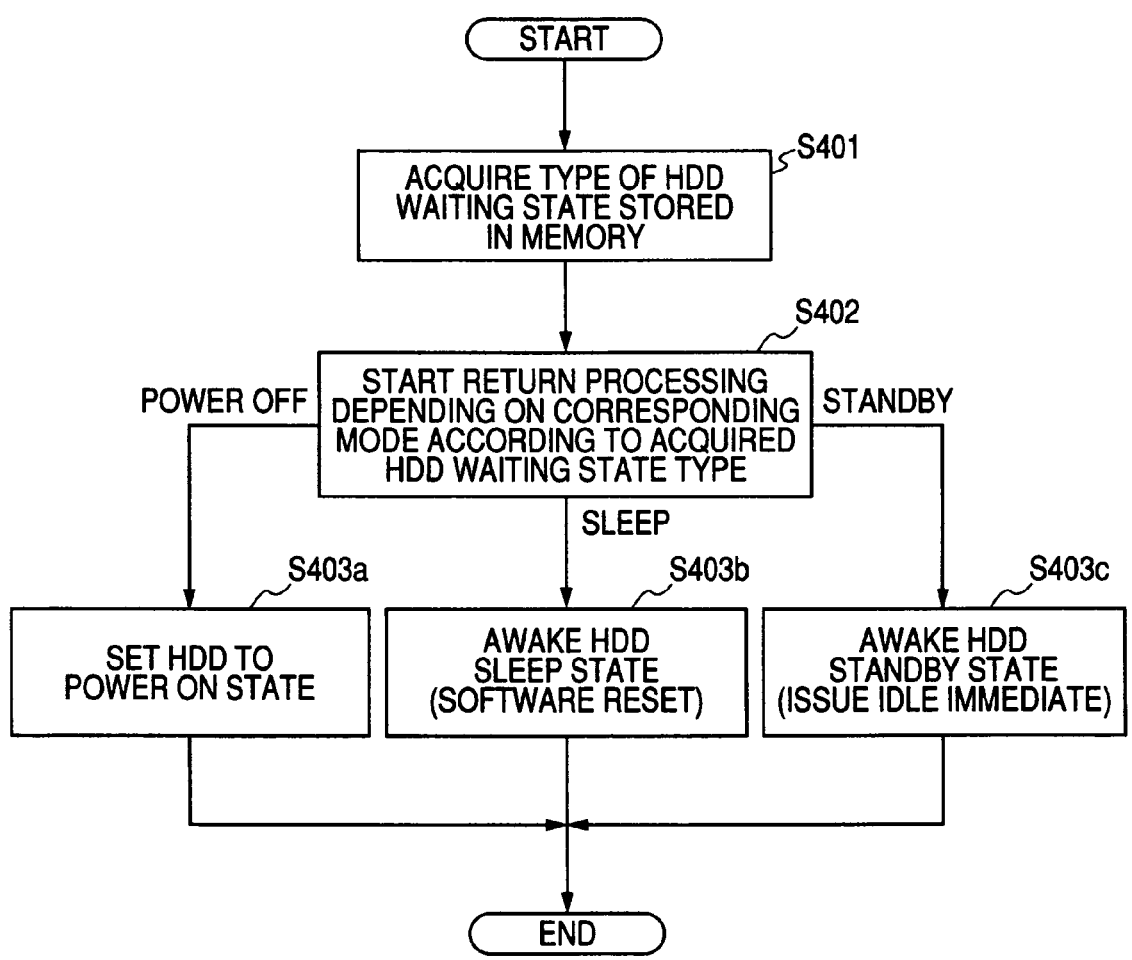
FIG. 7 is a diagram showing a flowchart explaining the sequence of changing the recording medium from the waiting state to the accessible state executed in the imaging apparatus as an embodiment of the information processing apparatus of the invention.

Next, with reference to flowcharts shown in FIG. 6 and FIG. 7, a sequence of processing of returning the HDD in the waiting state to the accessible state will be explained. The processing is also executed by control by the control unit 104 in the apparatus shown in FIG. 1. First, in step S301 of the flowchart shown in FIG. 6, access destination (recording destination or reading source) information is inputted. The information is information determined by program control which automatically executes processing of deciding a recording medium, for example, with user input from the operation unit 105, mount and unmount processing of various media such as mount and unmount of a removable flash memory, or activation processing.

The control unit decides whether HDD was selected as the access destination or not in step S302, and it is judged that HDD was selected as the access destination, the process proceeds to step S303, where processing of setting HDD from the waiting state to the accessible state is executed.

The detailed sequence of changing processing from the waiting state to the accessible state of the HDD in step S303 will be explained with reference to the flowchart shown in FIG. 7. First, in step S401, the control unit acquires type information of the HDD waiting state stored in the memory. The types are ones explained before with reference to FIG. 5, and in the example, any information of the following waiting states is acquired.
1: power off state
2: sleep state
3: standby state In step S402, the control unit starts return processing corresponding to the present waiting state of the HDD, according to information acquired from the memory. When the present waiting state of the HDD is the power off state, processing of changing the HDD from the power off state to a power on state is executed in step S403a. When the present waiting state of the HDD is the sleep state, processing of returning the HDD from the sleep state, for example, software reset processing is performed in step S403b. When the present waiting state of the HDD is the standby state, processing of returning the HDD from the standby state, for example, processing of issuing "IDLE IMMEDIATE" is performed in step S403c.

Information of programs to be executed at the time of various kinds of returning processing from the waiting state to the accessible state can be acquired from information stored in the memory, namely, return processing information explained before with reference to FIG. 5B. The control unit decides a program to be executed at the time of return processing from return processing information stored in the memory and executes the program, thereby performing correct return processing corresponding to the present waiting state.

Figure 8:
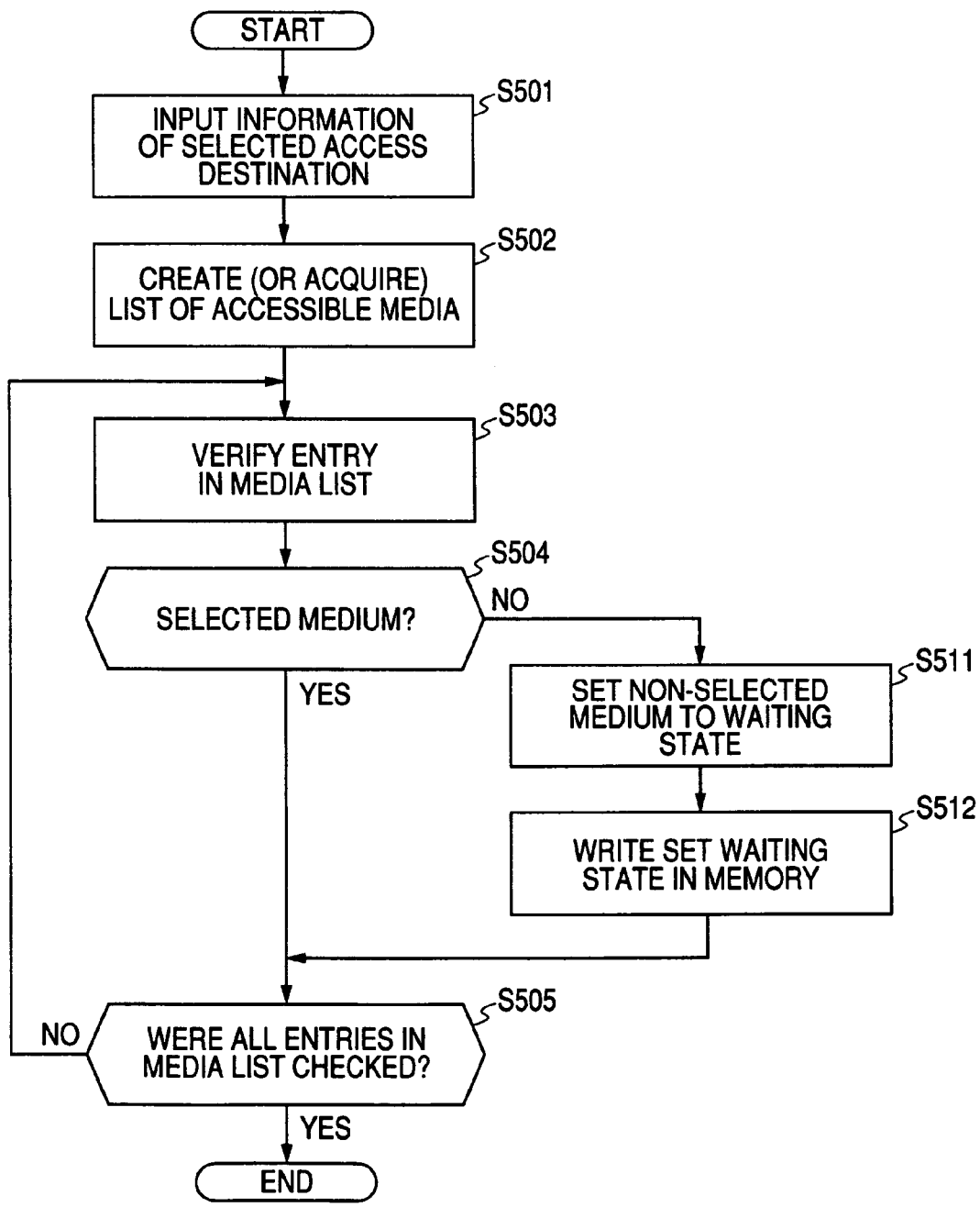
FIG. 8 is a diagram showing a flowchart explaining a sequence of changing the recording medium to the waiting state executed in an embodiment of the information processing apparatus of the invention.

Next, with reference to FIG. 8 and thereafter, a processing configuration in which in the information processing apparatus capable of using plural data recording media, a media list recording state information of respective recording media is stored in the memory, and efficient and correct processing of changing to the waiting state and return processing from the waiting state to the accessible state are realized by applying media list.

First, with reference to a flowchart shown in FIG. 8, a sequence of setting processing of a recording medium to a waiting state will be explained. The processing is also executed by control of the control unit 104 in the apparatus shown in FIG. 1. First, in step S501, access destination (recording destination or reading source) information is inputted. The information is information determined by program control which automatically executes processing of deciding a recording medium, for example, with user input from the operation unit 105, mount and unmount processing of various media, or activation processing.

The control unit creates a list of accessible media or acquires the list from the memory in step S502. This is the media list shown in FIG. 9. The media list shown in FIG. 9 is the list in which the same information as information explained before with reference to FIG. 5B is set as entries corresponding to respective recording media.

As shown in FIG. 9, the media list is the list in which the media number, the media type, the state identifier, waiting processing information and return processing information corresponding to respective media are associated with one another. As explained previously with reference to FIG. 5A, the state identifiers are information of identifying respective states such as:

1: power off state
  2: sleep state
  3: standby state
  0: non-waiting state.

The waiting processing information includes program information executed at the time of waiting processing, parameter information stored at the time of the waiting and the like, and the return processing information includes program information which becomes necessary for the return processing, parameter information which becomes necessary for the return.

The explanation of the flowchart shown in FIG. 8 will be continued. In step S503, the control unit sequentially acquires each entry in the media list, and in step S504, the control unit decides whether an entry corresponds to the selected medium selected as the access destination or not. When it is judged that the entry corresponds to the selected medium, the process proceeds to step S505, where the control units decides whether all entries in the media list have been checked or not, and when there is an entry which has not been checked, the process returns to step S503 and processing with respect to the entry which has not been checked is executed.

In step S504, when it is judged that the entry does not correspond to the selected medium selected as the access destination, the process proceeds to step S511, where the non-selected medium not selected as the access destination is set to a waiting state, and in the step S512, list updating processing is executed, which sets information corresponding to the set waiting state, that is, respective information of state identifiers, waiting processing information, and return processing information in the media list. After that, in step S505, the same processing is executed repeatedly until all entries in the media list are checked.

Figure 10:
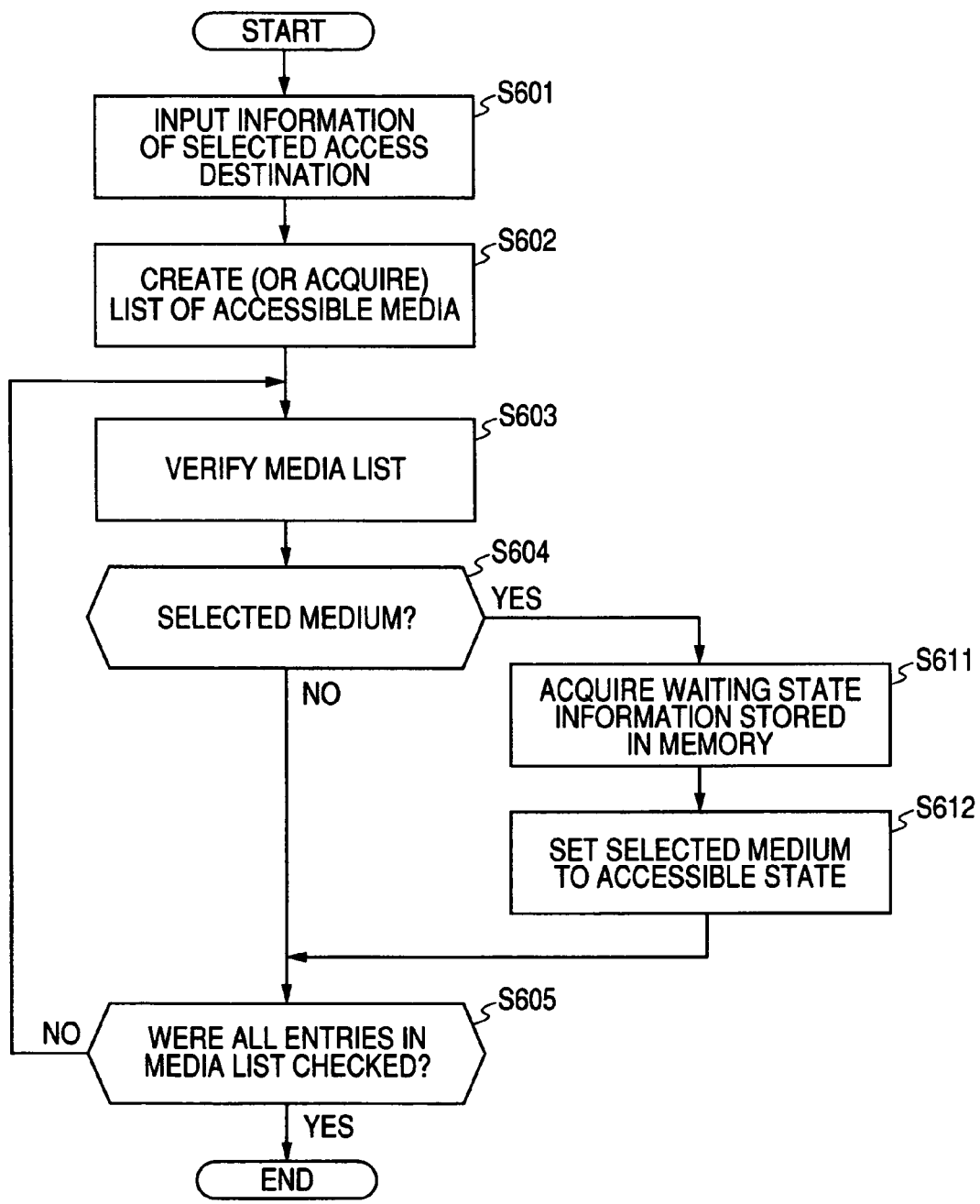
FIG. 10 is a diagram showing a flowchart explaining a sequence of changing the recording medium from the waiting state to the accessible state executed in an embodiment of the information processing apparatus of the invention.

According to the above processing, respective information of state identifiers, waiting processing information and return processing information indicating states of media available in the information processing apparatus is updated to be stored in the memory. When respective media are returned from the waiting state to the accessible sate, processing using the media list is executed. The sequence of return processing of a recording medium from the waiting state to the accessible state will be explained with reference to a flowchart shown in FIG. 10. The processing is also performed by control of the control unit 104 in the apparatus shown in FIG. 1.

First, in step S601, access destination (recording destination or reading source) information is inputted.

The information is information determined by program control which automatically executes processing of deciding a recording medium, for example, with user input from the operation unit 105, mount and unmount processing of various media, or activation processing.

The control unit creates a list of accessible media or acquires the list from the memory in step S602. This is the media list shown in FIG. 9. As shown in FIG. 9, the media list is the list in which the media number, the media type, the state identifier, waiting processing information and return processing information corresponding to respective media are associated with one another.

In step S603, the control unit sequentially acquires each entry in the media list, and in step S604, decides whether an entry corresponds to the selected medium as the medium to which changing processing from the waiting state to the access state is performed. When it is judged that the entry does not correspond to the selected medium, the process proceeds to step S605, where the control unit decides whether all entries in the media list have been checked or not, and when there is an entry which has not been checked, the process returns to step S603 and processing with respect to the entry which has not been checked is executed.

In step S604, when it is judged that the entry corresponds to the selected medium, the process proceeds to step S611, where the state identifier indicating the waiting state set in the entry of the media list is acquired and the waiting state set at present (any of power off, the sleep and the standby) is decided. In step S612, return processing according to the waiting state is executed to be changed to the accessible state. After that, the process proceeds to step S605 and the same processing is performed repeatedly until all entries in the media list are checked.

Information of programs to be executed at the time of processing executed in step S612, namely, processing of returning from various waiting states corresponding to state identifiers to the accessible state can be acquired from information stored in the memory explained with reference to FIG. 9, namely, the return processing information. The control unit decides the program to be executed at the time of return processing from the return processing information stored in the memory and executes the program, thereby performs correct return processing corresponding to the present waiting state.

Next, a system configuration of the information processing apparatus executing the above processing will be explained. The above processing of data recording with respect to the information recording media and the processing of data acquisition and reading from the information recording media are performed by executing a prescribed data processing program by the CPU of information processing apparatuses such as a digital video camera and a PC.

Figure 11:
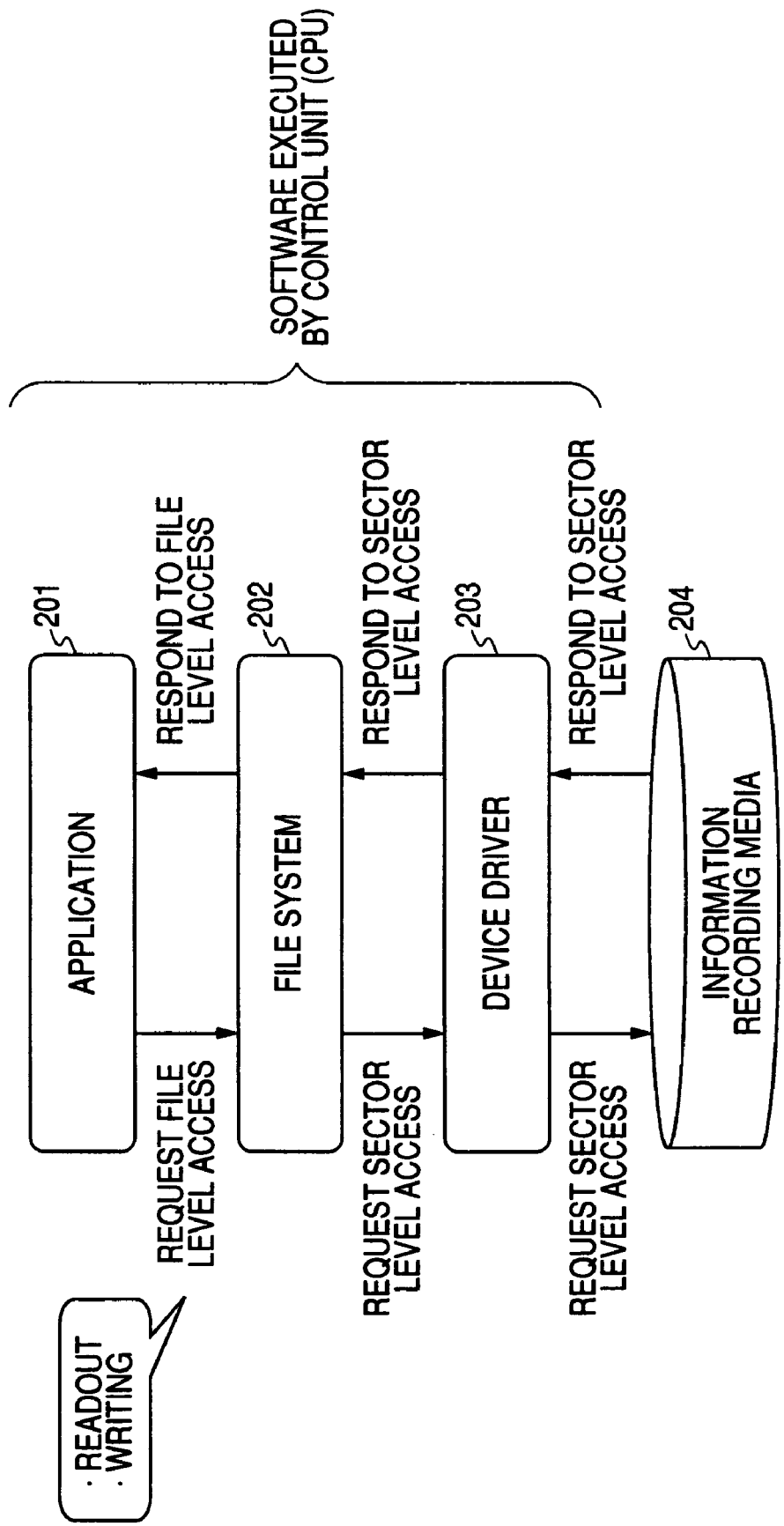
FIG. 11 is a diagram explaining a system configuration of the information processing apparatus according to an embodiment of the invention.

Specifically, as shown in FIG. 11, when data is recorded in an information recording medium 204 such as the hard disk or data recorded in the recording medium 204 is readout and used, at the lower layer of an application program 201 which becomes a point of contact for the user, there are a file system (file management program) 202 for managing files in the information recording medium 204 and a device driver 203 for controlling the information recording medium 204 based on information from the file system.

When data is recorded in the information recording medium 204, or data is read from the information recording medium 204, writing and reading are executed by functions of the file system 202 and the device driver 203. The same processing as related arts is performed between the file system, the device driver and the recording medium (hard disk).

Next, as configuration examples of the information processing apparatus executing the above processing, examples of apparatus configurations of a digital video camera as an imaging apparatus and a PC will be explained with reference to FIG. 12 and FIG. 13.

First, the configuration example of the digital video camera will be explained with reference to FIG. 12. The digital video camera acquires picture and audio information, and records picture data and audio data in various information recording media such as a magnetic disk, an optical disk, a magneto-optical disk and a semiconductor memory through the drive 432. Media in which data is recorded can be selected.

As processing of recording data in media, there are a moving-picture taking mode which takes moving pictures and records audio picked up at the same time in a recording medium and a still-pictures taking mode which takes still pictures. Additionally, in a playback mode, data supplied by operating an operation input unit 420 including a record button switch and the like is recorded, and target data recorded in the recording medium can be played back by operating a playback button switch.

Figure 12:
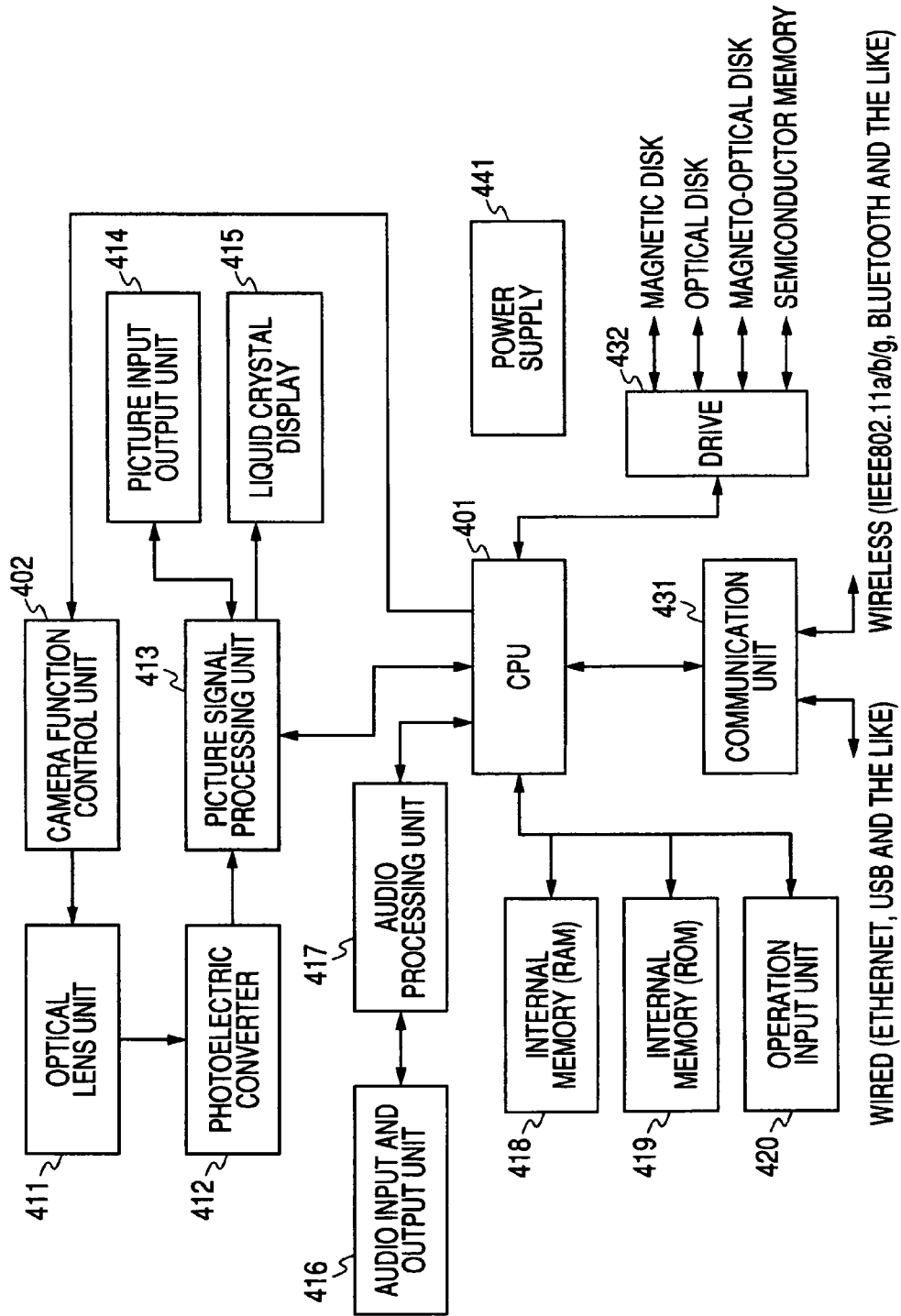
FIG. 12 is a diagram explaining a configuration example of a digital video camera as an embodiment of the information processing apparatus of the invention.

As shown in FIG. 12, the digital video camera includes an optical lens unit 411, a photoelectric converter 412, a camera function control unit 402, a picture signal processing unit 413, a picture input and output unit 414, a liquid crystal display 415, an audio input and output unit 416, an audio signal processing unit 417, a communication unit 431, a control unit (CPU) 401, an internal memory (RAM) 418, an internal memory (ROM) 419, an operation input unit 420, a drive 432 with respect to information recording media, and further a power supply 441 supplying power to respective configuration units.

The control unit (CPU) 401 performs processing according to various processing programs stored in the ROM 419. The RAM 418 is used as a work area, which temporarily stores in-progress results in respective processing, for example.

The operation input unit 420 includes various kinds of operation keys and function keys, for example, a mode-switching keys switching operation modes such as the moving-picture taking mode, the still-pictures taking mode, a VTR mode and the like, a shutter key for taking still pictures, a start key for taking moving pictures, a record key, a playback key, a stop key, a fast-forward key, and a fast-rewind key, receiving operation input from the user to supply an electrical signal according to the received operation input to the control unit (CPU) 401.

The control unit (CPU) 401 reads out and executes a program for performing the object processing according to operation input by the user, and controls processing according to instructions from the user by controlling respective units. Various information recording media such as the magnetic disk, the optical disk, the magneto-optical disk, and the semiconductor memory can be mounted on the digital video camera, and the camera records various kinds of information into the information recording media through the drive 432 and reads information recorded in these information recording media.

Next, with reference to FIG. 13, a hardware configuration example of a PC as an embodiment of the information processing apparatus performing the above processing will be explained. A CPU (Central Processing Unit) 501 functions as a data processing unit executing processing corresponding to OS (Operating System), data recording using different files explained in the above embodiment or data reading processing. These processing are executed according to computer programs stored in the data storage units such as the ROM and the hard disk of the information processing apparatus.

A ROM (Read Only Memory) 502 stores programs used by the CPU 501, computing parameters and the like. A RAM (Random Access Memory) 503 stores programs used for execution by the CPU 501, parameters accordingly changed in the execution and the like. These are mutually connected by a host bus 504 including a CPU bus and the like.

The host bus 504 is connected to an external bus 506 such as a PCI (Peripheral Component Interconnect/Interface) bus and the like through a bridge 505.

A keyboard 508 and a pointing device 509 are input devices operated by the user. A display 510 includes a liquid crystal display device or a CRT (Cathode Ray Tube) and the like, displaying various information in text or image.

A HDD (Hard Disk Drive) 531 and a flash memory 532 are recording media which can be selectively applied. They are controlled by the CPU 501 as the control unit, which record or read data such as pictures and audio, other programs or information.

A connection port 514 is a port which connects external connection equipment 522, including connection parts of USB, IEEE1394 and the like. The connection port 514 is connected to the CPU 501 and the like through an interface 507, the external bus 506, the bridge 505, the host bus 504 and the like. A communication unit 515 is connected to a network, performs communication with other information processing apparatuses.

Figure 13:
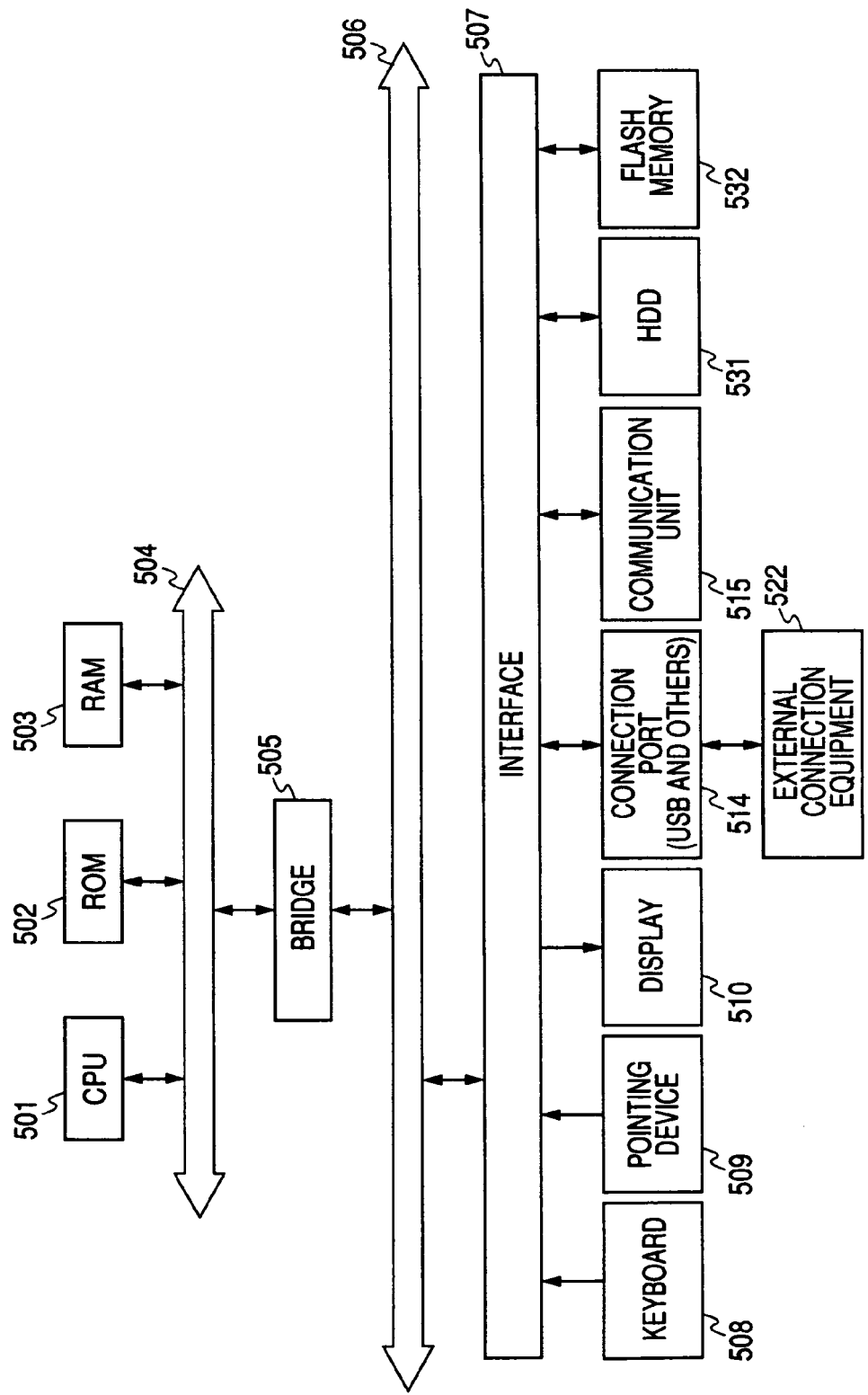
FIG. 13 is a diagram explaining a configuration example of a PC as an embodiment of the information processing apparatus of the invention.

The configuration examples of the information processing apparatuses shown in FIG. 12 and FIG. 13 are examples of apparatuses, and the information processing apparatus is not limited to configurations shown in FIG. 12 and FIG. 13, and may be a configuration which can execute processing explained in the above embodiment.

In the above embodiment, the hard disk is explained as a representative example of a recording medium which requires mechanical operations, namely, as a mechanical operation executing medium, however, the same processing as explained in the above embodiment can be applied to other recording media, for example, disk-type media such as DVD, which has possibility of generating mechanical noise such as seek operation of pick up, disk rotation and the like. Thus, the quality of the recording data can be improved by applying the invention.

As described above, the invention has been explained in detail with reference to specific embodiments. However, it is obvious that those skilled in the art can make modifications or alternations of the embodiment within a scope not departing from the gist of the invention. That is to say, the invention has been disclosed in the form of exemplification, and it should not be limitedly interpreted. In order to determine the gist, a section of claims should be taken into consideration.

A series of processing explained in the specification can be executed by hardware, software or composite configuration of the both. When processing is executed by software, it is possible that programs which record the processing sequences are installed in a memory in a computer incorporated in dedicated hardware to execute the processing, or programs are installed in a general-purpose computer capable of executing various processing.

For example, programs can be previously recorded in the hard disk or the ROM (Read Only Memory) as recording media. It is also possible that programs are stored (recorded) temporarily or permanently in removable recording media such as a flexible disk, a CD-ROM (Compact Disc Read Only Memory), a MO (Magneto Optical) disk, a DVD (Digital Versatile Disc), a magnetic disk, and a semiconductor memory. These removable recording media can be provided as so-called package software.

In addition to the installation from the removable recording media to the computer as described above, programs can be installed in recording media such as the internal hard disk by receiving programs in a computer, which are transferred from a download site by wireless or transferred by wire through networks such as a LAN (Local Area Network) and Internet.

The various processing described in the specification may not only executed according to the description in time series but also be executed in parallel or individually depending on processing capability of the apparatus which performs processing, or if necessary. In addition, a system means, in the specification, a logical assembly configuration of plural devices, and it is not limited to the system in which devices of respective configuration are in the same casing.

As described above, according to an embodiment of the invention, in the configuration having plural recording media including at least one recording medium which performs mechanical operations such as head seek, disk rotation and the like as in the hard disk, it becomes possible to prevent quality deterioration of record data caused by noise due to mechanical operations. That is, whether the mechanical executing medium such as the hard disk is selected as the access target or not is decided, and when the medium is not selected as the access target, processing of setting the mechanical executing medium to the waiting state is performed, therefore, occurrence of noise can be prevented, which is caused by execution of the head seek, start of disk rotation or stop processing while data is written into another medium such as the flash memory, as a result, quality deterioration of record data due to noise mixed into the data can be prevented.

It should be understood by those skilled in the art that various modifications, combinations, sub-combinations and alterations may be occur depending on design requirements and other factors insofar as they are within the scope of the appended claims or the equivalents thereof.

The invention claimed is:

1. An information processing apparatus, comprising:
   plural media capable of recording data; and
   a control unit executing operation control of the plural media,
   wherein at least one medium in the plural media is a mechanical operation executing medium performing mechanical operations, and
   wherein the control unit is operable to decide whether the mechanical operation executing medium is selected as an access target, and when the medium is not selected as the access target, to perform processing of setting the mechanical operation executing medium to a waiting state,
   wherein the control unit executes processing of recording waiting state type information into a storage unit at the time of setting processing of the mechanical operation executing medium to the waiting state, and
   wherein the waiting state type information comprises information indicating whether or not the waiting state type is a power off state, whether or not the waiting state type is a sleep mode state, and whether or not the waiting state type is a standby mode state.

2. The information processing apparatus according to claim 1,
   wherein the control unit executes processing of recording information applied to processing of changing from the waiting state to an accessible state into the storage unit at the time of setting processing of the mechanical operation executing medium to the waiting state.

3. The information processing apparatus according to claim 1,
   wherein the control unit decides whether the mechanical operation executing medium is selected as the access target or not, and when the medium is selected as the access target as well as in the waiting state of the mechanical operation executing medium, performs processing of changing the mechanical operation executing medium from the waiting state to the accessible state.

4. The information processing apparatus according to claim 1,
   wherein the control unit acquires waiting state type information from a storage unit and performs a return processing sequence corresponding to the waiting state decided based on the type information at the time of processing of changing the mechanical operation executing medium from the waiting state to the accessible state.

5. The information processing apparatus according to claim 1,
   wherein the mechanical operation executing medium is a hard disk.

6. The information processing apparatus according to claim 1 wherein the waiting state type information corresponds to waiting states of the mechanical operation executing medium, wherein each waiting state type information represents a spindle stopped state, and wherein sleep state and the standby state each have a level of power consumption different from the other.

7. An imaging apparatus, comprising:
   an imaging unit;
   plural media capable of recording data acquired in the imaging unit; and
   a control unit executing operation control of the plural media,
   wherein at least one medium of the plural media is a mechanical operation executing medium performing mechanical operations, and
   wherein the control unit is operable to decide whether the mechanical operation executing medium is selected as an access target, and when the medium is not selected as the access target, to perform processing of setting the mechanical operation executing medium to a waiting state,
   wherein the control unit executes processing of recording waiting state type information into a storage unit at the time of setting processing of the mechanical operation executing medium to the waiting state, and
   wherein the waiting state type information comprises information indicating whether or not the waiting state type is a power off state, whether or not the waiting state type is a sleep mode state, and whether or not the waiting state type is a standby mode state.

8. An information processing method, comprising the steps of:
   inputting access information of a medium selected as an access destination in plural media which are capable of recording data;
   deciding whether a mechanical operation executing medium is selected as an access target or not;
   setting the mechanical operation executing medium to a waiting state when the mechanical operation executing medium is not selected as the access target; and
   executing processing of recording waiting state type information into a storage unit at the time of setting processing of the mechanical operation executing medium to the waiting state,
   wherein the waiting state type information comprises information indicating whether or not the waiting state type is a power off state, whether or not the waiting state type is a sleep mode state, and whether or not the waiting state type is a standby mode state.

9. The information processing method according to claim 8, further comprising the step of:

executing processing of recording information applied to processing of changing from the waiting state to an accessible state into the storage unit at the time of setting processing of the mechanical operation executing medium to the waiting state.

10. The information processing method according to claim 8, further comprising the steps of:

deciding whether the mechanical operation executing medium is selected as the access target or not; and changing the mechanical operation executing medium from the waiting state to the accessible state when the medium is selected as the access target as well as in the waiting state of the mechanical operation executing medium.

11. The information processing method according to claim 8, further comprising the steps of:

acquiring waiting state type information from the storage unit; and performing a return processing sequence corresponding to the waiting state decided based on the type information at the time of processing of changing the mechanical operation executing medium from the waiting state to the accessible state.

12. The information processing method according to claim 8, wherein the mechanical operation executing medium is a hard disk.

13. A computer-readable medium storing a computer-readable program operable to allow an information processing apparatus to execute control of recording media, the program executing the steps of:

inputting access information of a medium selected as an access destination in plural media which are capable of recording data;

deciding whether a mechanical operation executing medium is selected as an access target or not;

setting the mechanical operation executing medium to a waiting state when the mechanical operation executing medium is not selected as the access target; and executing processing of recording waiting state type information into a storage unit at the time of setting processing of the mechanical operation executing medium to the waiting state, wherein the waiting state type information comprises information indicating whether or not the waiting state type is a power off state, whether or not the waiting state type is a sleep mode state, and whether or not the waiting state type is a standby mode state.

* * * * *